Jan. 29, 1929.  1,700,171
C. E. LEONARD
ADJUSTABLE WINDSHIELD SUNSHADE
Filed Nov. 4, 1927
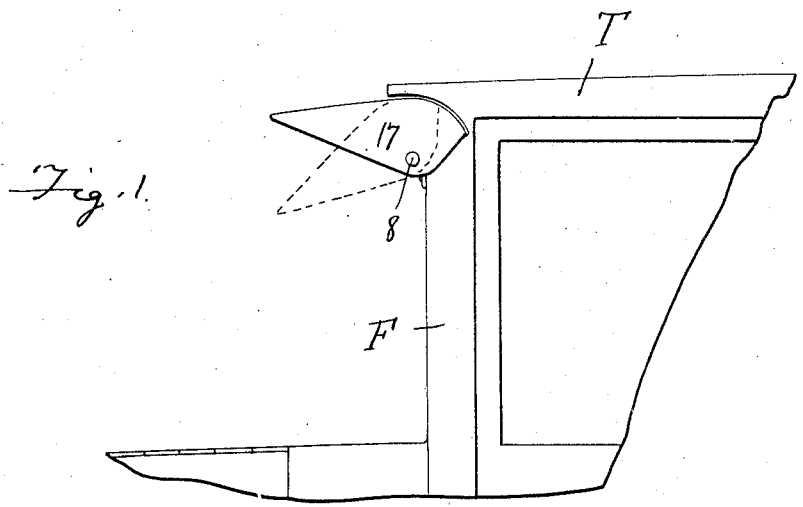
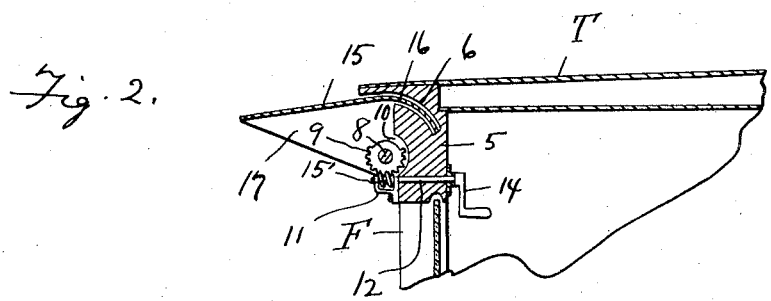
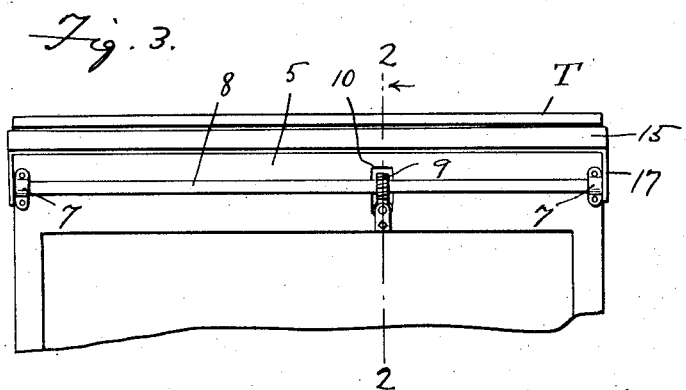
Inventor
Charles E. Leonard
By *Clarence A. O'Brien*
Attorney Patented Jan. 29, 1929.

1,700,171

UNITED STATES PATENT OFFICE.

CHARLES E. LEONARD, OF ANSELMO, NEBRASKA, ASSIGNOR OF ONE-HALF TO DOMNICK ROLLI, OF ANSELMO, NEBRASKA.

ADJUSTABLE WINDSHIELD SUNSHADE.

Application filed November 4, 1927. Serial No. 231,046.

The present invention relates to a sun shade for the windshield of an automobile body of the closed type and has for its prime object to provide a structure of this nature which may be easily and quickly adjusted to different desired positions, and is incorporated in the windshield structure in a compact and convenient manner so as to be unitary in appearance with the body construction.

Another very important object of the invention resides in the provision of a sun shade of this nature in combination with adjusting means which will hold the shade in different positions against accidental adjustment.

A still further important object of the invention resides in the provision of an adjustable sunshade of this nature that is exceedingly simple in its construction, strong and durable, inexpensive to manufacture, attractive in appearance, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is a fragmentary side elevation showing the front portion of the top of a closed automobile body with my improved sun shade mounted thereon, Figure 2 is a vertical section therethrough taken substantially on the line 2—2 of Figure 3, and Figure 3 is a front elevation of the structure illustrated in Figure 2.

Referring to the drawing in detail it will be seen that the letter F denotes the windshield frame of the top T of a closed type automobile body of any preferred or conventional construction. The top cross rail of the frame F is denoted specifically by the numeral 5 and is formed with a longitudinally extending slot 6 which is arcuate transversely as is quite apparent from an inspection of Figure 2. A pair of bearing brackets 7 are mounted on the front face of the cross rail 5 at the ends thereof, and a shaft 8 is journaled in these bearing brackets. On an intermediate portion of the shaft 8 preferably to the left of its center there is fixed a worm gear 9. The rail 5 is recessed in its front surface as at 10 to accommodate this worm gear 9. A bracket 11 is mounted on the rail 5 to the front thereof adjacent the lower edge immediately below the recess 10 and one end of a shaft 12 is journaled therein and said shaft is journaled through the rail 5 terminating interiorly of the body and the inner end thereof has fixed thereon a crank 14. On the outer end of the shaft 12 there is fixed a worm 15' meshing with the worm gear 9.

The sun shade per se is preferably constructed of sheet metal having an elongated body 15 which is curved in an arc as at 16 adjacent one side for movement in the slot 6. Depending ends 17 are formed on the end edges of the body 15 and are of a somewhat triangular formation. These ends 17 are fixed on the shaft 8 so that the rocking of the shaft will cause adjustments of the shield as will be quite apparent.

From the above detailed description it will be seen that I have devised an exceedingly simple sun shade structure which is incorporated in the frame F in a compact and convenient manner so as to be easily operated by the driver of the automobile simply by turning the crank 14. The turning of this crank 14 obviously rotates the shaft 12 and the worm 15' so as to rock the worm gear 9, the shaft 8 and the sun shade.

The sun shade is prevented from accidental movement because of the worm and worm gear since it is difficult to rotate the worm by the worm gear. In this way, vibration and rattling are eliminated to a considerable degree.

It is thought that the construction, operation, utility and advantages of the invention will now be quite apparent to those skilled in this art without a more detailed description thereof. The present embodiment of the invention has been disclosed in detail merely by way of example since in actual practice it attains the features of advantage enumerated as desirable in the statement of the invention and the above description. It will be apparent that changes in the details of construction, and in the combination and arrangement of parts may be resorted to without departing from the spirit or scope of the appended claim, as hereinafter claimed or sacrificing any of its advantages.

Having thus described my invention, what I claim as new is:—

In combination, a windshield frame comprising a top cross rail having a longitudinally extending slot curved arcuately transversely of the rail, bearings at the ends of the rail, a shaft journaled in the bearings concentrically in relation to the curvature of said slot, means for rotating the shaft, and a shield including a body with lateral ends fixed to the shaft, said body having a curved portion concentric with and movable in the slot.

In testimony whereof I affix my signature.

CHARLES E. LEONARD.